(12) United States Patent
Hoshi

(10) Patent No.: US 6,219,486 B1
(45) Date of Patent: Apr. 17, 2001

(54) REPRODUCING APPARATUS FOR REPRODUCING DATA AT A SPEED DIFFERENT FROM THAT AT WHICH RECORDING IS PERFORMED

(75) Inventor: Hidenori Hoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/462,478

(22) Filed: Jun. 5, 1995

Related U.S. Application Data

(63) Continuation of application No. 08/061,317, filed on May 14, 1993, now abandoned.

(30) Foreign Application Priority Data

May 18, 1992 (JP) ...................................... 4-125037
May 18, 1992 (JP) ...................................... 4-125038

(51) Int. Cl.[7] .............................. H04N 5/76; H04N 5/783
(52) U.S. Cl. .................................. 386/46; 386/68
(58) Field of Search ..................... 358/312, 335, 358/339, 337; 360/32, 10.1, 10.3; 386/46, 68, 91, 124, 112, 95, 77, 78, 81; H04N 5/76, 5/783

(56) References Cited

U.S. PATENT DOCUMENTS

| | | | |
|---|---|---|---|
| 4,139,867 | * | 2/1979 | Foerster ................................ 360/10 |
| 4,280,147 | * | 7/1981 | Baldwin ................................ 360/10 |
| 4,395,738 | * | 7/1983 | Hedlund ................................ 386/68 |
| 4,398,224 | * | 8/1983 | Watanabe .............................. 358/339 |
| 4,626,912 | * | 12/1986 | Wilkinson ............................. 358/339 |
| 4,698,698 | * | 10/1987 | Collins ................................. 358/312 |
| 5,060,077 | * | 10/1991 | Koya et al. ........................... 358/312 |
| 5,177,729 | * | 1/1993 | Muramatsu et al. .................. 358/312 |
| 5,208,677 | * | 5/1993 | Nishimura ............................. 358/335 |
| 5,220,425 | * | 6/1993 | Enary et al. ........................... 386/68 |
| 5,253,118 | * | 10/1993 | Konno ................................... 386/86 |
| 5,253,119 | * | 10/1993 | Takeshita et al. ..................... 386/77 |
| 5,260,839 | * | 11/1993 | Matsuta et al. ....................... 358/339 |
| 5,329,366 | * | 7/1994 | Kuroda ................................... 386/85 |

FOREIGN PATENT DOCUMENTS 63-306504   12/1988   (JP) .

* cited by examiner

Primary Examiner—Huy Nguyen
(74) Attorney, Agent, or Firm—Fitzpatrick, Cella, Harper & Scinto

(57) ABSTRACT

A reproducing apparatus is provided in which the recording data, having a predetermined number of image data divided into synchronizing blocks, is reproduced at a speed different from that in the recording mode. The apparatus has a memory unit having a memory capacity of two fields. The reproduced image data is written into one of the field areas in the memory unit. The field areas in the memory unit into which the data should be written are switched at a predetermined period. The data is read out from the field area in which the writing operation is not executed.

30 Claims, 14 Drawing Sheets

US 6,219,486 B1

REPRODUCING APPARATUS FOR REPRODUCING DATA AT A SPEED DIFFERENT FROM THAT AT WHICH RECORDING IS PERFORMED

This application is a continuation of application Ser. No. 08/061,317 filed May 14, 1993, now abandoned.

BACKGROUND OF THE INVENTION

1. Field of the Invention

The invention relates to an apparatus for reproducing a digital recording.

2. Related Background Art

There is known a recording method whereby information such as an image signal is digitally recorded onto a magnetic tape by a helical scan system. A recording method of interleave recording under predetermined rules is used in order to improve a picture quality for a burst or a signal dropout in a normal reproducing mode, a reproduction disable region in a special reproducing mode, or the like (for example, JP-A-63-306504).

FIG. 1 is a plan view of a rotary drum of such a helical scan type digital recording and reproducing apparatus. FIG. 2 shows a development diagram of the rotary drum. Reference numeral 50 denotes a rotary drum; 52A, 52B, 54A and 54B, magnetic heads for recording or reproducing; and 56, a magnetic tape. Each of the heads 52A and 54A has a plus azimuth angle. Each of the heads 52B and 54B has a minus azimuth angle. Each of the heads 52A and 54A is arranged so as to be away from each of the heads 52B and 54B by only a small angle θ in the circumferential direction of the rotary drum 50. Each of the heads 52A and 52B is arranged so as to be away from each of the heads 54A and 54B by an angle of 180° in the circumferential direction of the rotary drum 50. In the recording or reproducing mode, a pair of heads 52A and 52B and another pair of heads 54A and 54B are alternately used.

FIG. 3 shows a recording format of a magnetic tape in case of using eight tracks per one frame. A+ denotes tracks which are recorded or reproduced by the magnetic heads 52A and 54A. B− indicates tracks which are recorded or reproduced by the magnetic heads 52B and 54B. Image data of an even field (field #0) are recorded to the former half four tracks. Image data of an odd field (field #1) are recorded to the remaining four tracks.

FIG. 4 shows a data structure of one picture plane. In case of the NTSC system, one frame has 512 horizontal scanning lines and the image data are divided into synchronizing blocks on a line unit basis. On the CRT screen shown in FIG. 4, a solid line indicates a line of the even field and a broken line denotes a line of the odd field. In a line data block $L_{n,m}$, n denotes a distinction (0 or 1) of the field and m indicates a line number. Each of the synchronizing blocks comprises: a sync code (sync) to match the synchronization timing; an identification code (ID) to identify each synchronizing block; image data of the line; and an error detection correction code P.

FIG. 5 is a block diagram showing a construction of a recording system of a conventional apparatus. FIG. 6 is a block diagram showing a construction of a reproducing system of the conventional apparatus.

In FIG. 5, an analog video signal to be recorded is supplied to an input terminal 10. An A/D converter 12 converts the analog video signal from the input terminal 10 into a digital signal. A coding circuit 14 compresses and encodes the output data from the A/D converter 12 by, for example, a DPCM coding method. The compression coded image data from the coding circuit 14 are written into a frame memory 16 and is also supplied to an error detection correction coding circuit 18. The coding circuit 18 generates the error detection correction code P to the compressed image data on a line unit basis and writes the resultant image data into the memory 16. The memory 16 ordinarily has a memory capacity of two frames. An address generation circuit 20 generates a write address and a read address of the memory 16.

A sync-ID addition circuit 22 adds a sync code (sync) and an ID for every line to the data read out from the memory 16, thereby forming a line data block as shown in FIG. 5. A modulation circuit 24 modulates an output of the sync-ID addition circuit 22 (for example, converts the output into an NRZI signal). An output signal of the modulation circuit 24 is magnetically recorded onto a magnetic tape 28 by a magnetic head 26. The magnetic head 26 corresponds to the magnetic heads 52A, 52B, 54A and 54B shown in FIGS. 1 and 2.

The reproducing system of FIG. 6 will now be described. The magnetic recording signal on the magnetic tape 28 is electromagnetically converted by the magnetic head 26. A demodulation circuit 30 demodulates the output of the magnetic head 26 and generates the digital signal of the line data block structure. A sync-ID separation circuit 32 separates the ID, image data, and error detection correction code P in accordance with the (sync) code sync from the line data block which is generated from the demodulation circuit 30. The reproduction image data and the error detection correction code P are supplied to a memory 34. The reproduction ID is supplied to an address generation circuit 36.

The address generation circuit 36 generates write addresses of the memory 34 in accordance with the reproduction ID. The memory 34 also generally has a memory capacity of two frames. An error detection correction circuit 38 detects and corrects errors in the image data stored in the memory 34 with reference to the error detection correction code P of the memory 34. The address generation circuit 36 generates a read address of the memory 34, thereby, reading out from memory 34 the image data of the frame whose error detecting correcting processes have been finished in the memory 34.

In case of reproducing the data at the same speed as that in the recording mode, the reproduction data are written into a first field memory area in the memory 34 in accordance with the ID of the line data block. In this instance, the data stored in another field memory area are read out. The memory area into which the data are written and the memory area from which the data are read out are changed for every field. FIG. 7 shows a memory space of a memory having a memory capacity of one frame. The ordinate indicates an address and the abscissa shows a time. Data are written in accordance with arrows shown by solid lines. The recorded data are read out in accordance with arrows shown by broken lines. Since the reading and writing operations of data are executed for different field memory areas, an outrun of the memory access does not occur.

A decoding circuit 40, shown in FIG. 6, executes a decoding process corresponding to the coding process in the coding circuit 14 to the data read out from the memory 34 and generates a digital image signal. A D/A converter 42 converts the digital output signal from the decoding circuit 40 into the analog signal. The analog signal is supplied from an output terminal 44 to a video monitor or the like.

In case of reproducing the data at the same speed as that in the recording mode, no problem occurs. In case of reproducing the data at a speed higher than that in the recording mode (hereinafter, such a reproduction is called a search reproduction), however, the magnetic head traces a plurality of tracks during each rotation. FIG. 8 shows a trace pattern for search reproduction. That is, data of different fields coexist in one frame period. Therefore, the address generation circuit 36 generates a write address existing in both of the odd field memory area and the even field memory area in the memory 34 in accordance with the reproduction ID. FIG. 9 shows the writing operation of the memory 34. The ordinate indicates an address and the abscissa shows a time. Since the data are reproduced by irregular addresses, the data are also irregularly written into the memory 34.

As mentioned above, since the writing operation is irregularly executed to the whole frame, there is no surplus time to read out the data. If the operator tries to forcedly read out data, the reading operation outruns the writing operation. To avoid such an outrun, hitherto, the frame memory having a memory capacity of at least two frames is used as a memory 34 and the memory area to write data and the memory area to read out the data are switched every frame.

When the frame memory having a large memory capacity of two frames is used, however, hardware size increases and costs also rise.

As will be clearly understood from a trace pattern shown in FIG. 8, not only data of a plurality of frames coexist in one frame period but also data which is not reproduced in one frame (or field) appears.

In case of the interlace system, the lines constructing one frame are alternately assigned to even fields and odd fields as shown in FIG. 10. Even if the data (for example, $L_{0,1}$ and $L_{1,1}$) of the lines which are neighboring on the screen could be reproduced, in case of an image which moves at a high speed, there is a case where a deviation between the times of those data is too large.

The line data block which has once been reproduced is not rewritten until the line data block of the same address in the memory 34 is reproduced. The rewriting period (hereinafter, called an updating period) is relatively long although it depends on the data shuffling or reproducing speed.

Because of the above reasons, a reproduced image becomes a remarkably unnatural image.

SUMMARY OF THE INVENTION

It is an object of the present invention to provide a reproducing apparatus which can solve the above deficiencies of a conventional apparatus.

According to an embodiment of the present invention, there is provided a reproducing apparatus in which recording data such that a predetermined number of image data is divided into synchronizing blocks is reproduced at a speed different from the speed in the recording mode, wherein the reproducing apparatus has memory means having a memory capacity of two fields, the reproduced image data is written into one of the two field areas in the memory means, the field area in the memory means into which the image data should be written is switched at a predetermined period, and the data is read out from the field area in which the writing operation is not being executed.

By the above means, while reproduction data is being written into one of the field areas, the stored data can be regularly read out from the other field area. Since the writing and reading operations are executed for the different field areas, an outrun of the address does not occur between the reading and writing operations.

According to another embodiment of the invention, there is provided a reproducing apparatus in which recording data such that a predetermined number of image data and its error detection code are divided into synchronizing blocks is reproduced at a speed different from that in the recording mode, wherein the reproduced image data and its error detection code are written into only a predetermined field area in memory means having a memory capacity of a plurality of fields, and the reproducing apparatus has interpolating means for interpolating the data read out from the memory means by the error detection code.

By the above memory means, storage of the image data necessary to construct one picture plane can be assured. On the other hand, since the insufficient image data or the image portion which is largely deviated with respect to the time is interpolated by the neighboring data by the interpolating means, a degree of unnaturality is reduced. Consequently, even when the image data is reproduced at a speed different from that in the recording mode, a natural reproduction image is obtained.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will be described hereinbelow with reference to the drawings.

Figure 11:
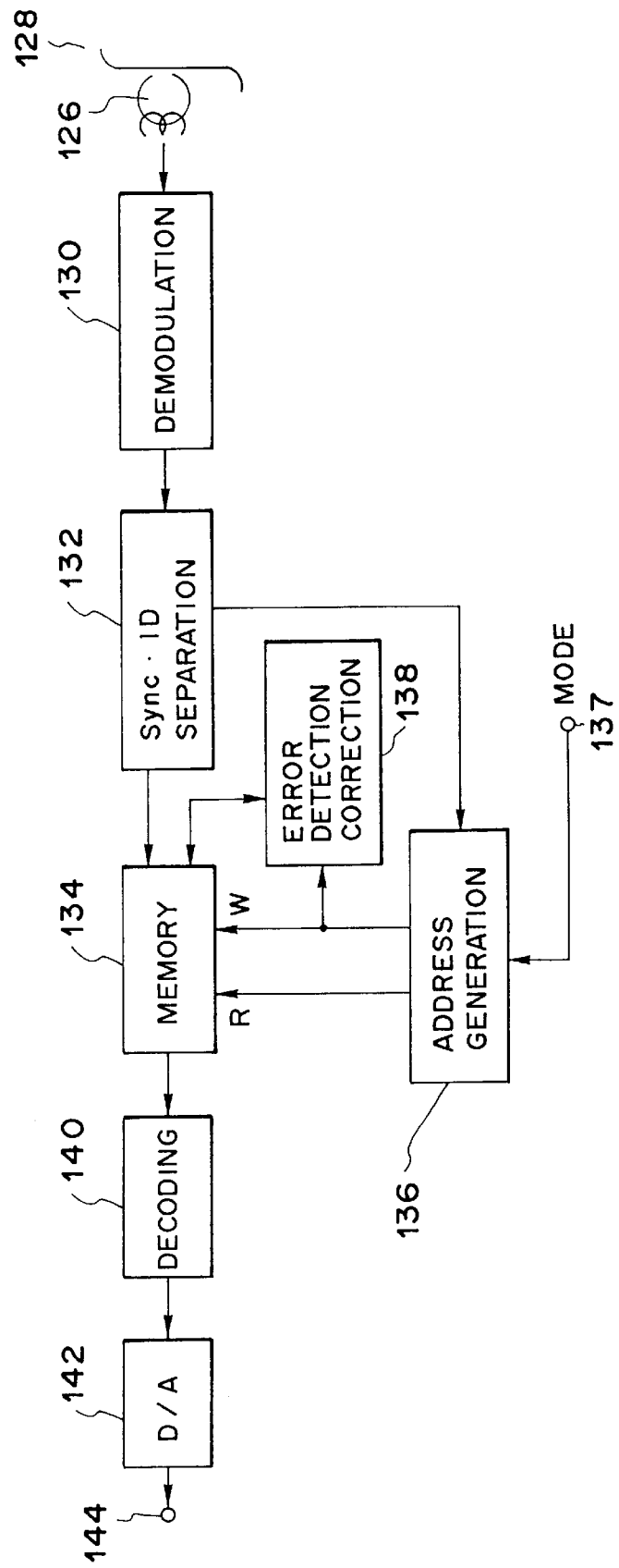
FIG. 11 is a block diagram showing a construction of a reproducing apparatus according to an embodiment of the present invention.

FIG. 11 is a block diagram showing a construction of an embodiment of a reproducing apparatus according to the present invention. Reference numeral 126 denotes a magnetic head; 128, a magnetic tape; 130, a demodulation circuit; 132, a sync-ID separation circuit; 134, a frame memory having a memory capacity of one frame; 136, an address generation circuit to generate a write address and a read address of the memory 134; 137, an input terminal of a reproduction mode signal in the normal reproducing mode, search reproducing mode, or the like; 138, an error detection correction circuit; 140, a decoding circuit similar to the decoding circuit 40; 142, a D/A converter; and 144, an output terminal.

The operation of the embodiment shown in FIG. 11 will now be described. A magnetic recording signal on the magnetic tape 128 is electromagnetically converted by the magnetic head 126. The demodulation circuit 130 demodulates an output of the magnetic head 126 and generates the digital signal of a line data block structure. From the line data block which is generated from the demodulation circuit 130, the sync-ID separation circuit 132 separates the ID, image data, and error detection correction code P in accordance with the sync code (sync). The reproduction image data and error detection correction code P are supplied to the memory 134. The reproduction ID is supplied to the address generation circuit 136.

A mode signal indicative of the reproducing mode such as normal reproducing mode, search reproducing mode, or the like is supplied to the mode input terminal 137 from a system control circuit (not shown). The mode signal is supplied to the address generation circuit 136. The address generation circuit 136 generates the write address and read address of the frame memory 134 in accordance with the mode signal and the reproduction ID from the sync-ID separation circuit 132.

Figure 12:
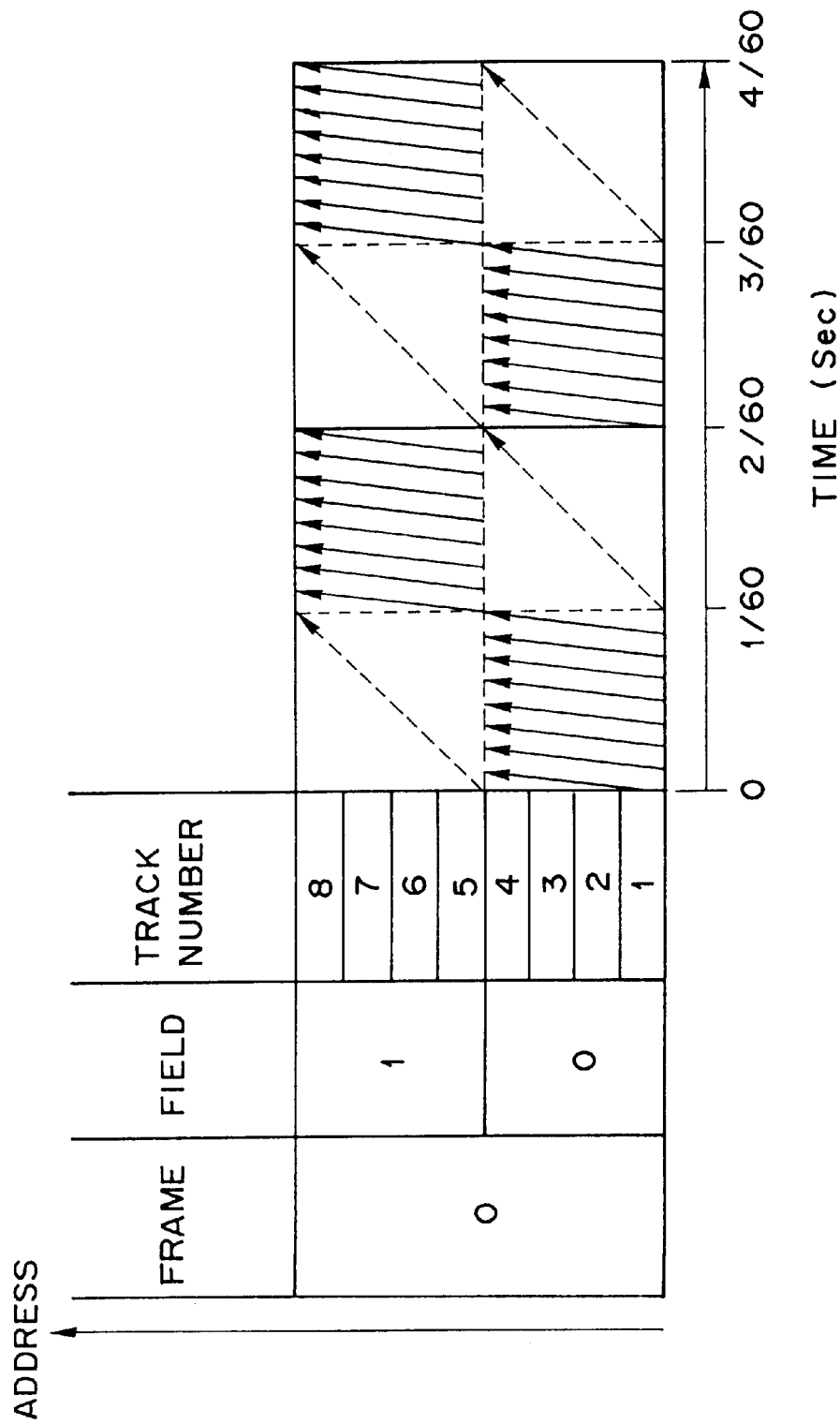
FIG. 12 is a diagram showing a memory access state in a memory 134 according to the embodiment in the search reproducing mode.

Specifically speaking, the address generation circuit 136 generates the write address in accordance with the reproduction ID from the sync-ID separation circuit 132 in the normal reproducing mode. In the search reproducing mode, the field addresses included in the reproduction ID are ignored and the field addresses are bank switched every 1/60 second. With respect to the read address, the field address different from the write address is generated in any of the normal reproducing mode and search reproducing mode, thereby linearly reading out the data from the field memory area. FIG. 12 shows a memory access state in the search reproducing mode. An axis of ordinate indicates the address. An axis of abscissa indicates the time. An arrow shown by a solid line denotes the writing operation. An arrow shown by a broken line denotes the reading operation.

The error detection correction circuit 138 reads out the memory data from the memory 134 by the write address which is generated by the address generation circuit 136 and detects and corrects errors in the reproduction image data which is stored into the frame memory 134.

The data (compressed image data) read out from the memory 134 is supplied to the decoding circuit 140. The decoding circuit 140 executes a decoding process corresponding to the coding process in the coding circuit 14 and generates the digital image signal. The D/A converter 142 converts an output of the decoding circuit 140 into the analog signal and supplies the analog signal from the output terminal 144 to a video monitor or the like.

In the embodiment, in the search reproducing mode, the reproduction data is written into the same field memory area in the memory 134 irrespective of the field address of the reproduction ID and the field memory areas into which the data should be written are switched at a field period. Therefore, the other field memory area can be used to read out the data. An outrun does not occur between the write address and the read address. As a memory capacity of the frame memory 134, it is sufficient to use a memory capacity of one frame.

As will be easily understood from the above description, according to the invention, even when data is reproduced at a speed different from that in the recording mode, the occurrence of the outrun between the data write and read addresses can be prevented with little memory. Therefore, even when the data are reproduced at a speed different from that in the recording mode, a natural reproduction image can be derived.

An embodiment of the present invention will be described hereinbelow with reference to the drawings.

Figure 13:
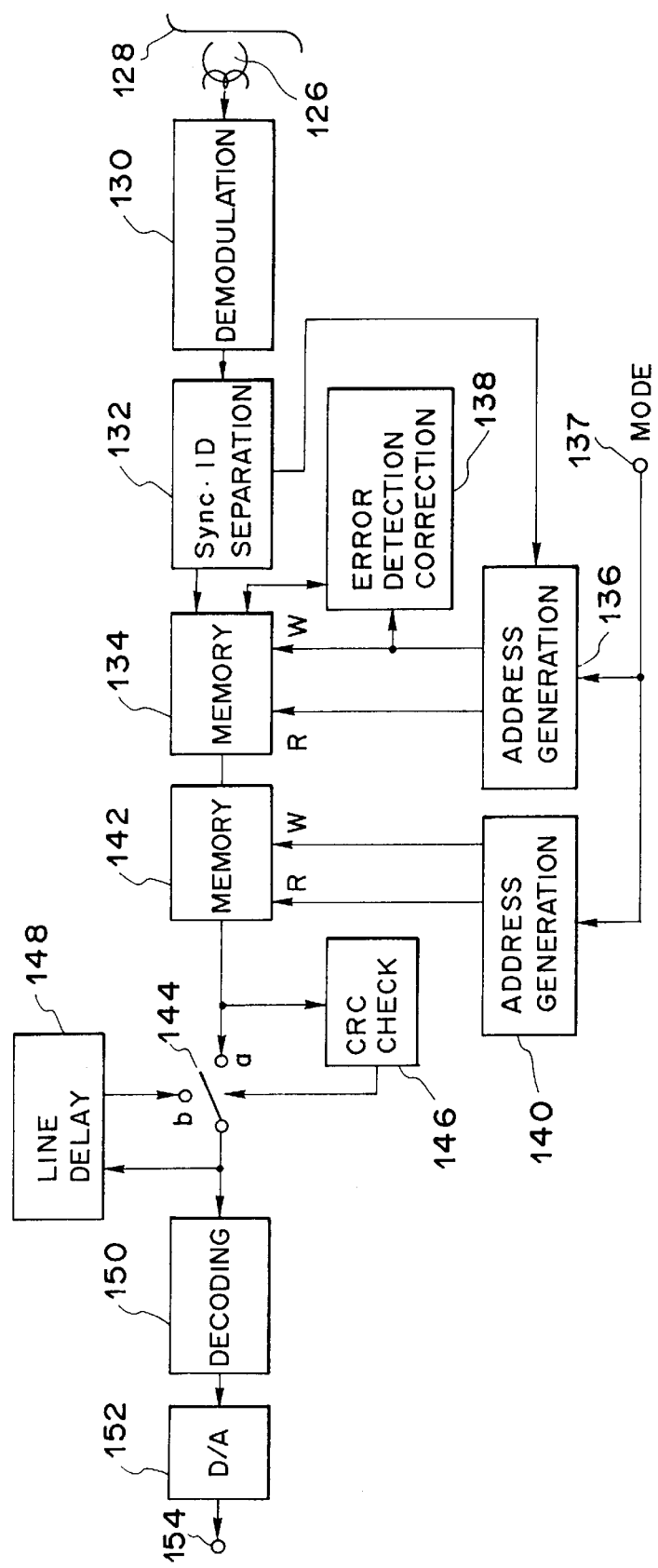
FIG. 13 is a block diagram showing a construction of a reproducing apparatus according to an embodiment of the invention.
Figure 14:
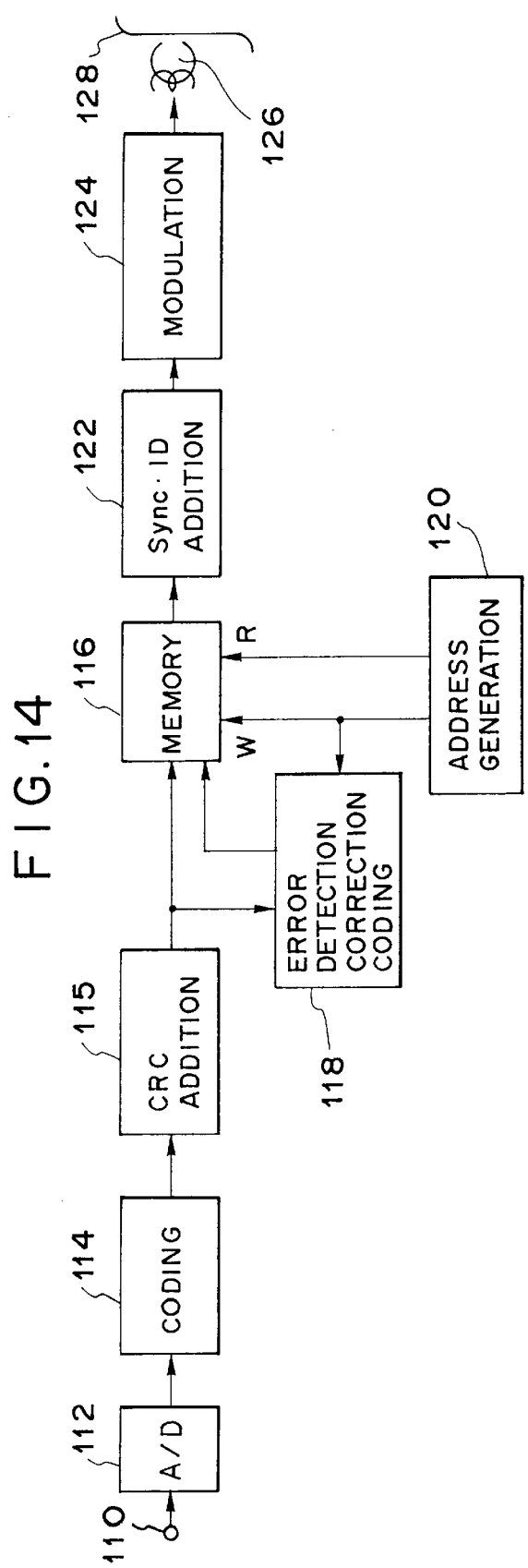
FIG. 14 is a block diagram showing a construction of a recording apparatus corresponding to the reproducing apparatus in FIG. 13.

FIG. 13 is a block diagram showing a construction of an embodiment of a reproducing apparatus according to the invention. FIG. 14 is a block diagram showing a construction of a recording apparatus corresponding to the reproducing apparatus.

The recording apparatus shown in FIG. 14 will be described first. An analog video signal of the interlace system to be recorded is supplied to an input terminal 110. An A/D converter 112 converts the analog video signal from the input terminal 110 into the digital signal. A coding circuit 114 compresses and codes the output data from the A/D converter 112 by, for example, a DPCM coding method. A CRC addition circuit 115 adds an error detection code CRC to the output data from the coding circuit 114 on a line unit basis.

An output signal of the CRC addition circuit 115 is written into a frame memory 116 and is also supplied to an error detection correction coding circuit 118. The coding circuit 118 produces the error detection correction code P on a line unit basis for the compressed image data and its CRC and writes the resultant data into the memory 116. The memory 116 generally has a memory capacity of two frames. An address generation circuit 120 generates a write address and a read address of the memory 116.

Figure 1:
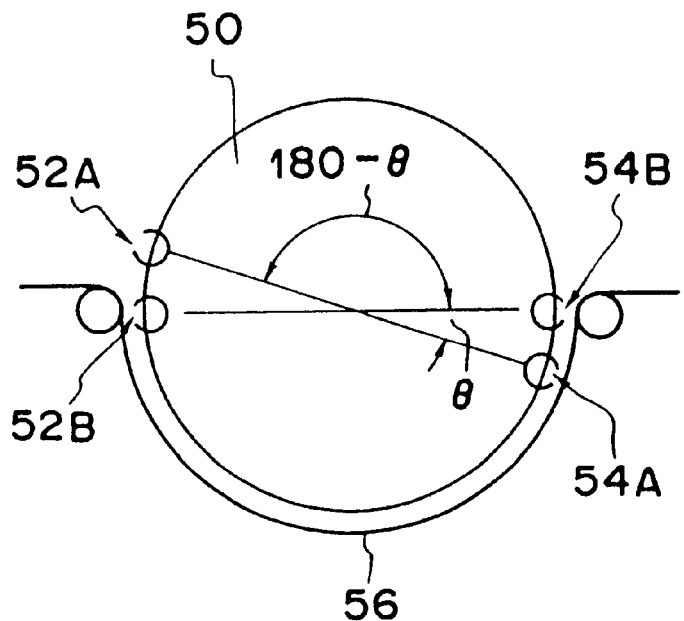
FIG. 1 is a plan view showing an arrangement of heads of a rotary drum.
Figure 2:
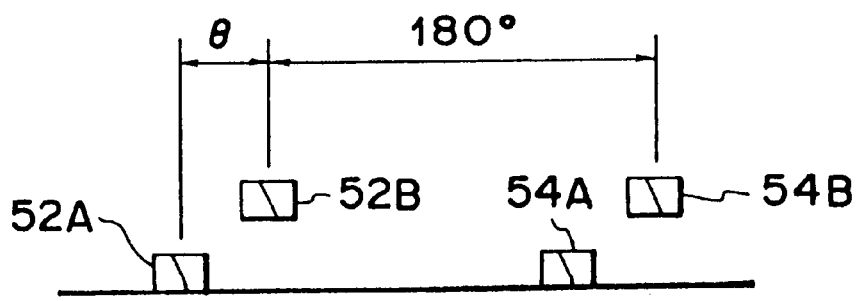
FIG. 2 is a development diagram showing the head arrangement of the rotary drum.
Figure 3:
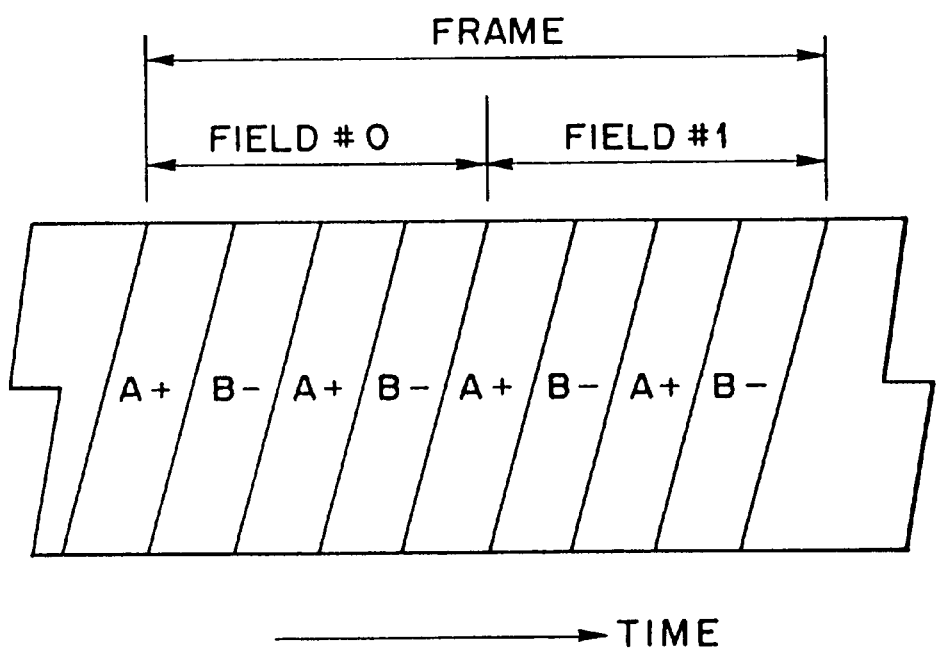
FIG. 3 is a diagram showing a track pattern by the heads shown in FIGS. 1 and 2.
Figure 4:
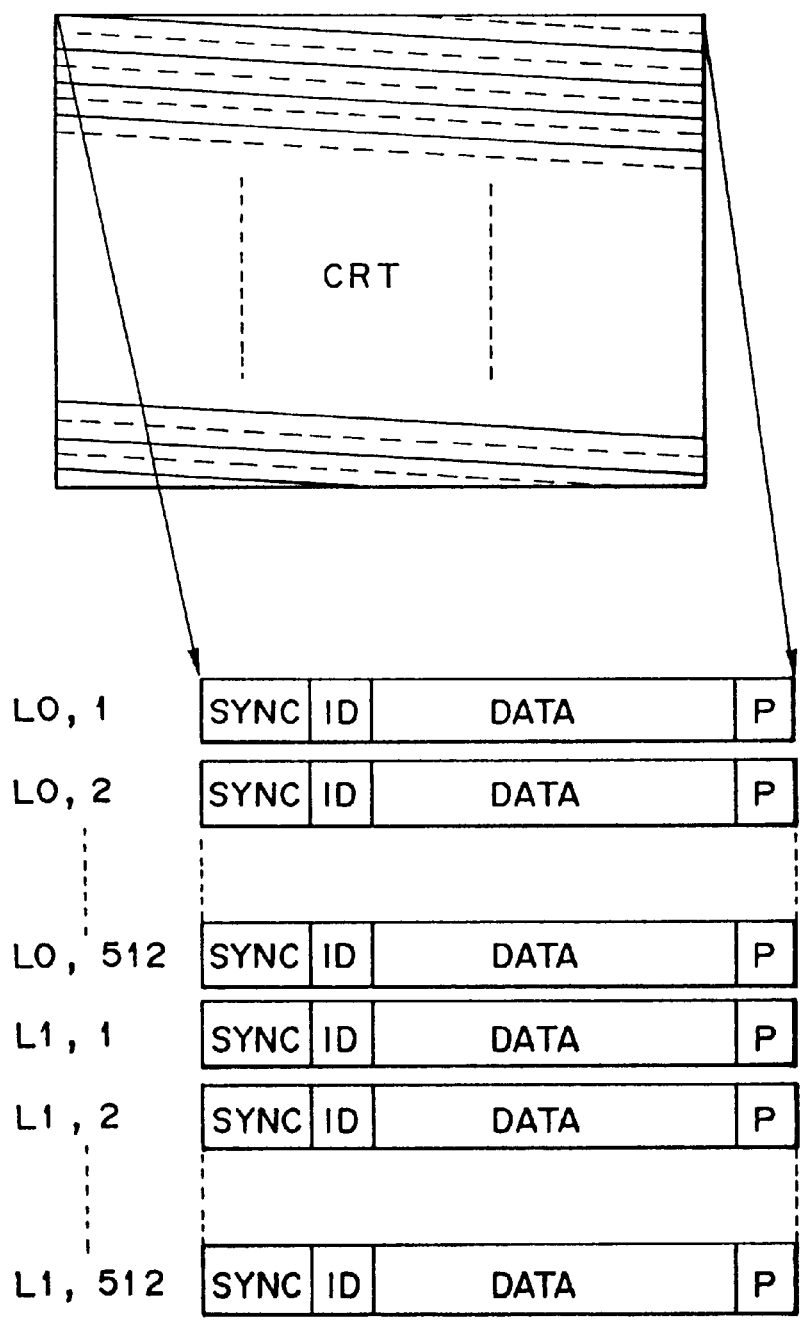
FIG. 4 is a diagram showing a structure of line data blocks of one picture plane.
Figure 5:
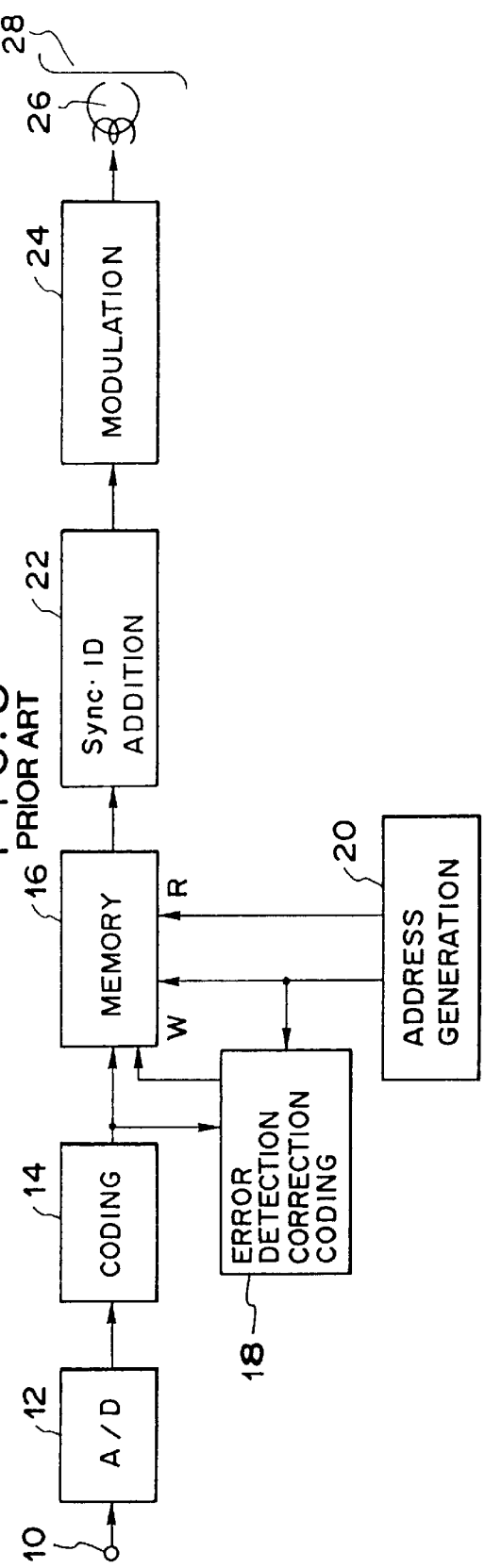
FIG. 5 is a block diagram showing a construction of a recording apparatus of a conventional apparatus.
Figure 6:
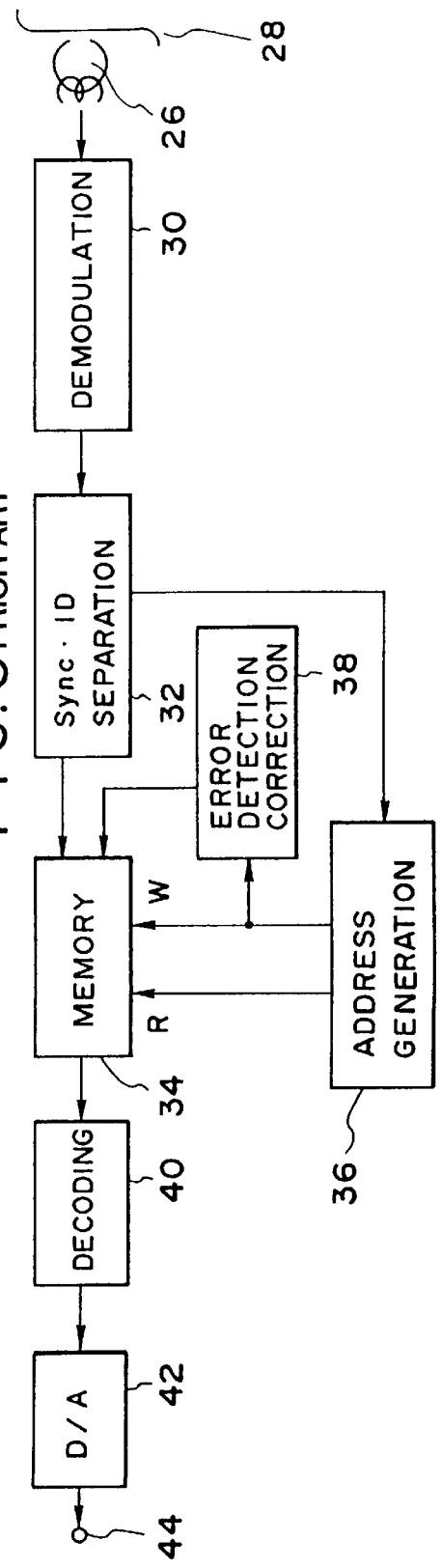
FIG. 6 is a block diagram showing a construction of a reproducing apparatus of the conventional apparatus.
Figure 7:
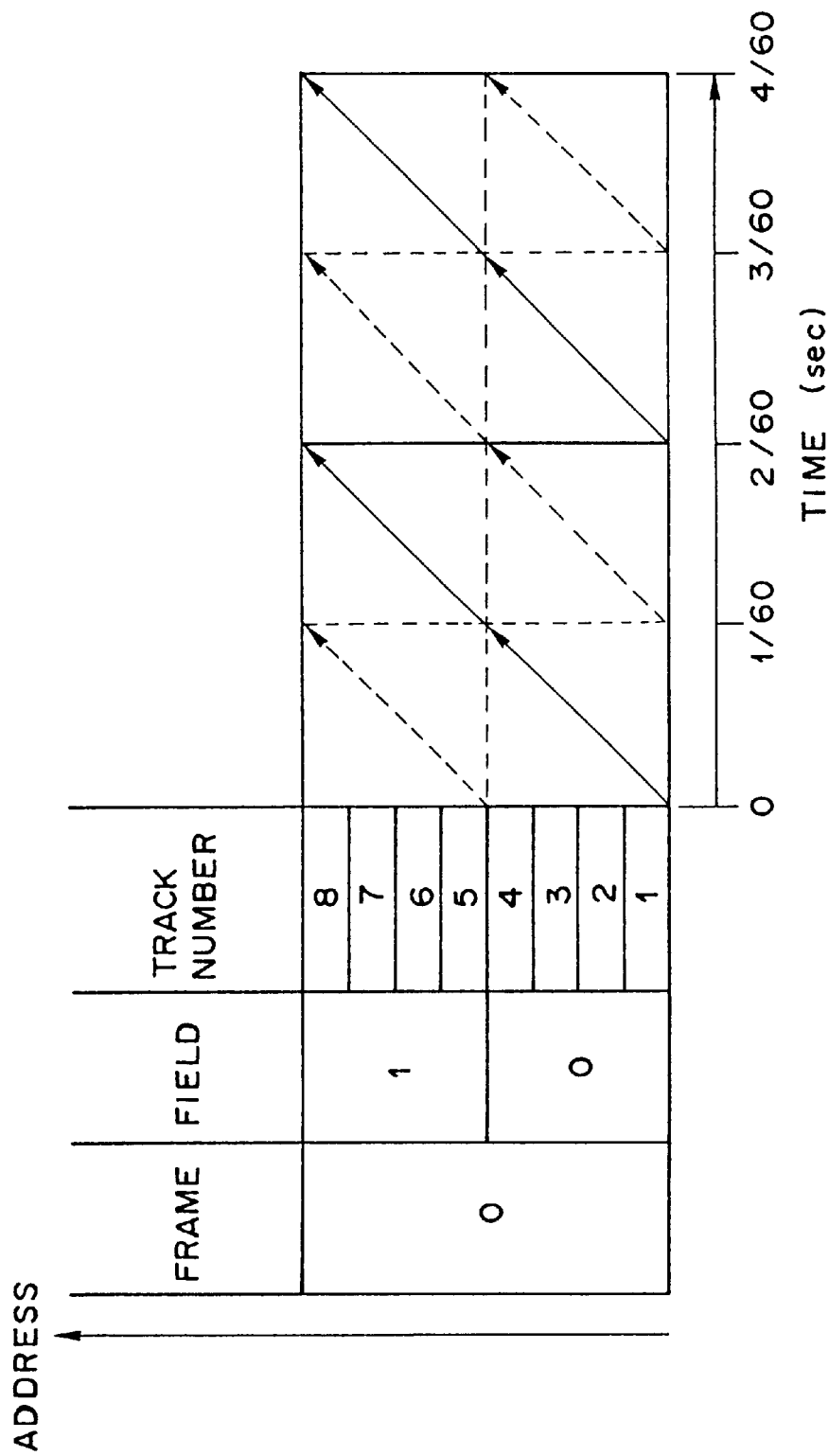
FIG. 7 is a diagram showing a memory access state in a memory of one frame in a normal reproducing mode.
Figure 15:
FIG. 15 is a diagram showing a structure of line data blocks which are produced in FIG. 14.

A sync-ID addition circuit 122 adds a sync code (sync) and an ID for every line to the data read out from the memory 116, thereby forming a line data block as shown in FIG. 15. A modulation circuit 124 modulates an output signal from the sync-ID addition circuit 122 (for example, converts the signal into an NRZI signal). An output signal of the modulation circuit 124 is magnetically recorded onto the magnetic tape 128 by the magnetic head 126. The magnetic head 126 corresponds to the magnetic heads 52A, 52B, 54A and 54B shown in FIGS. 1 and 2.

The reason why the error detection code CRC is added to the compressed image data from the coding circuit 114 by the CRC addition circuit 115 is to interpolate the lines with errors by the preceding line upon reproduction. The details will be described hereinlater.

The search reproducing operation of the reproducing apparatus shown in FIG. 13 will now be described. The magnetic recording signal on the magnetic tape 128 is electromagnetically converted by the magnetic head 126. The demodulation circuit 130 demodulates an output of the magnetic head 126 and generates the digital signal of a line data block structure shown in FIG. 15. From the line data block which is generated from the demodulation circuit 130, the sync-ID separation circuit 132 separates the ID, image data, CRC, and error detection correction code P in accordance with the sync code (sync). The reproduction image data, CRC, and error detection correction code P are supplied to the memory 134. The reproduction ID is supplied to the address generation circuit 136.

Figure 16:
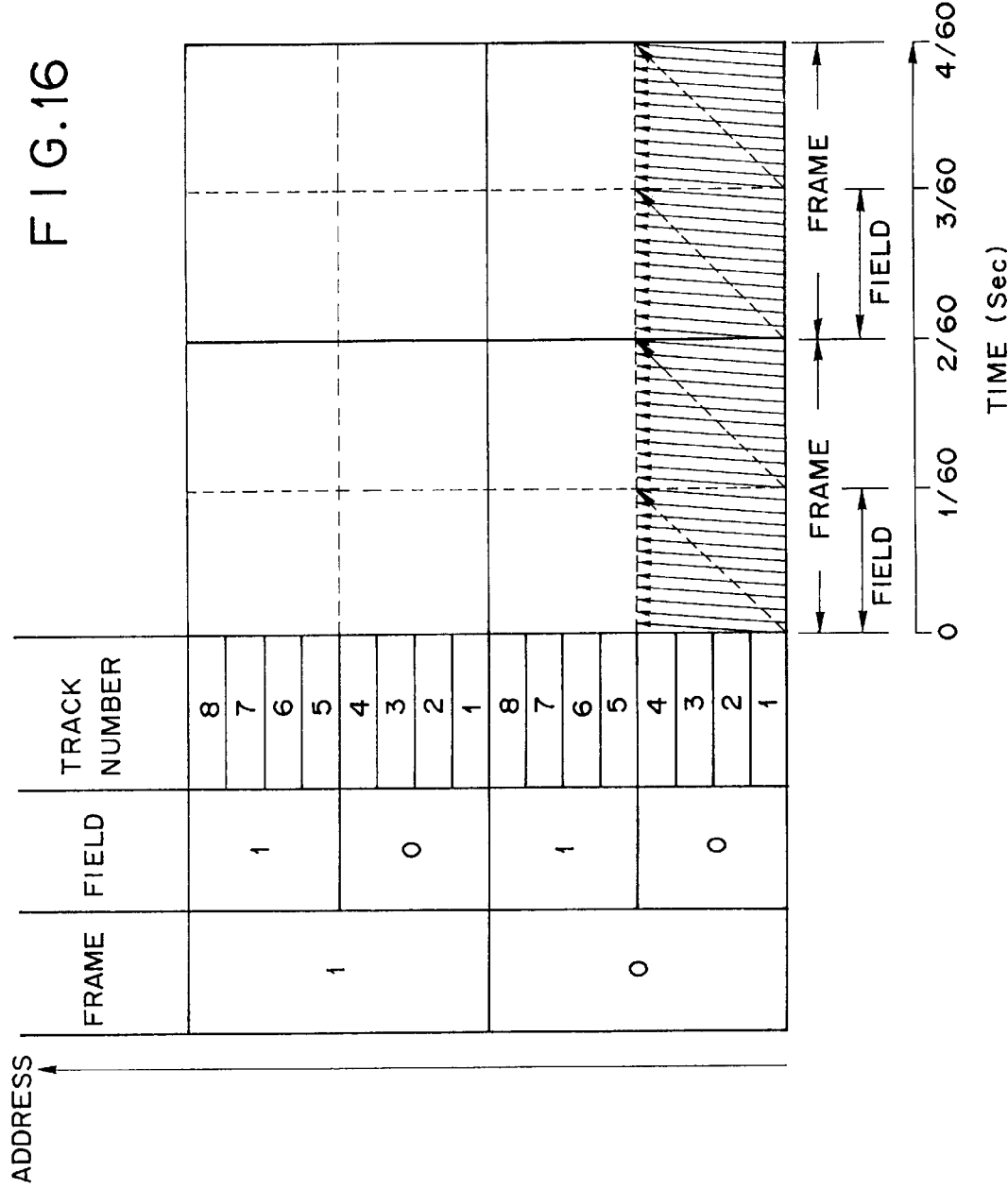
FIG. 16 is a diagram for explaining the memory addressing of the memory 134.

A mode signal indicative of the reproducing mode such as normal reproducing mode, search reproducing mode, or the like is supplied to the mode input terminal 137 from a system control circuit (not shown). The mode signal is supplied to the address generation circuit 136. The address generation circuit 136 generates the write address of the frame memory 134 in accordance with the mode signal and the reproduction ID from the sync-ID separation circuit 132. The frame memory 134 has a memory capacity of two frames. As a write address in the search reproducing mode, the address generation circuit 136 generates an address of a special field in the memory area of two frames in the memory 134. For example, as shown by arrows of solid lines in FIG. 16, the address in the field #0 in the frame #0 is generated. In FIG. 16, the abscissa indicates the time and the ordinate indicates the memory address.

The error detection correction circuit 138 reads out the memory data from the memory 134 by the write address that is generated from the address generation circuit 136, thereby detecting and correcting errors in the image data and CRC which are stored into the frame memory 134.

Figure 17:
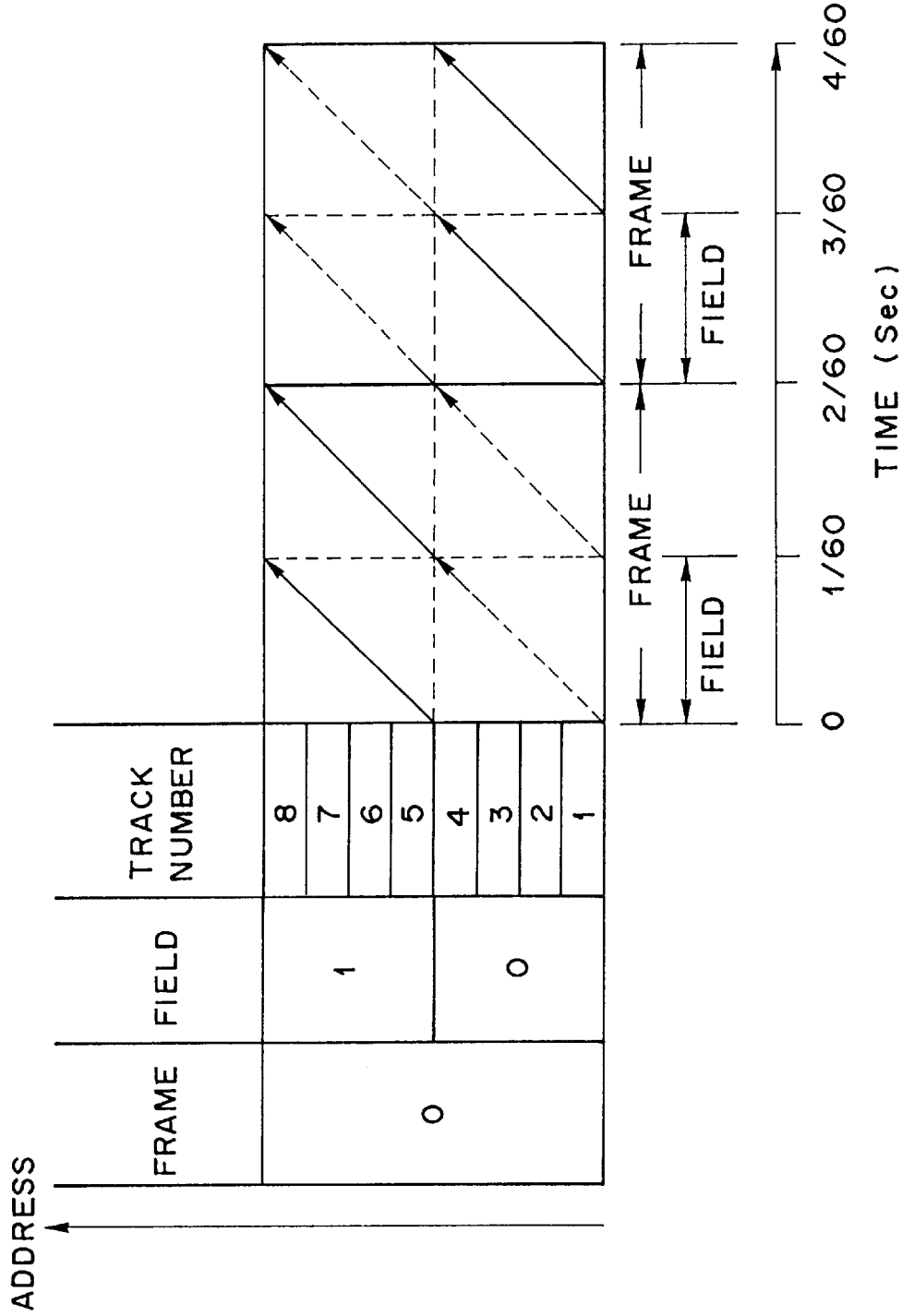
FIG. 17 is a diagram for explaining the memory addressing of a memory 142.

The address generation circuit 136 generates the read address of the memory 134. In the search reproducing mode, as shown by an arrow of a broken line in FIG. 16, the address in the field #0 in the frame #0 is generated. The data (compressed image data and CRC) read out from the memory 134 is written into a memory 142 in accordance with the address which is generated from an address generation circuit 140. FIG. 17 shows a memory space in the memory 142. An axis of abscissa indicates the time and an axis of ordinate indicates the memory address. The memory 142 has a memory capacity of one frame. The reproduction mode signal from the mode input terminal 137 is also supplied to the address generation circuit 140. In the search reproducing mode, the address generation circuit 140 generates a write address such as to execute a bank switching of the frames as shown by arrows of broken lines in FIG. 17.

The address generation circuit 140 also generates the read address of the memory 142. However, data is read out from a field different from the write field as shown by arrows of solid lines in FIG. 17 in a manner such that the read address does not coincide with the write address or the read address does not outrun the write address. The data of the same field is read out in the frame period of time.

The data (compressed image data and CRC) read out from the memory 142 is supplied to a contact a of a switch 144 and to a CRC check circuit 146. The CRC check circuit 146 detects the presence or absence of errors in the compressed image data by the CRC which is supplied from the memory 142. The switch 144 is ordinarily connected to the a contact. When there are errors, however, the CRC check circuit 146 switches the switch 144 to a b contact. An output of the switch 144 is returned to the b contact of the switch 144 through a line delay circuit 148. Therefore, the interpolation using the preceding line is executed by the switching to the b contact of the switch 144 by the CRC check circuit 146.

A decoding circuit 150 executes a decoding process corresponding to the coding process in the coding circuit 114 to the output signal of the switch 144 and generates a digital image signal. A D/A converter 152 converts an output of the decoding circuit 150 into an analog signal and supplies the analog signal from an output terminal 154 to a video monitor or the like.

Figure 8:
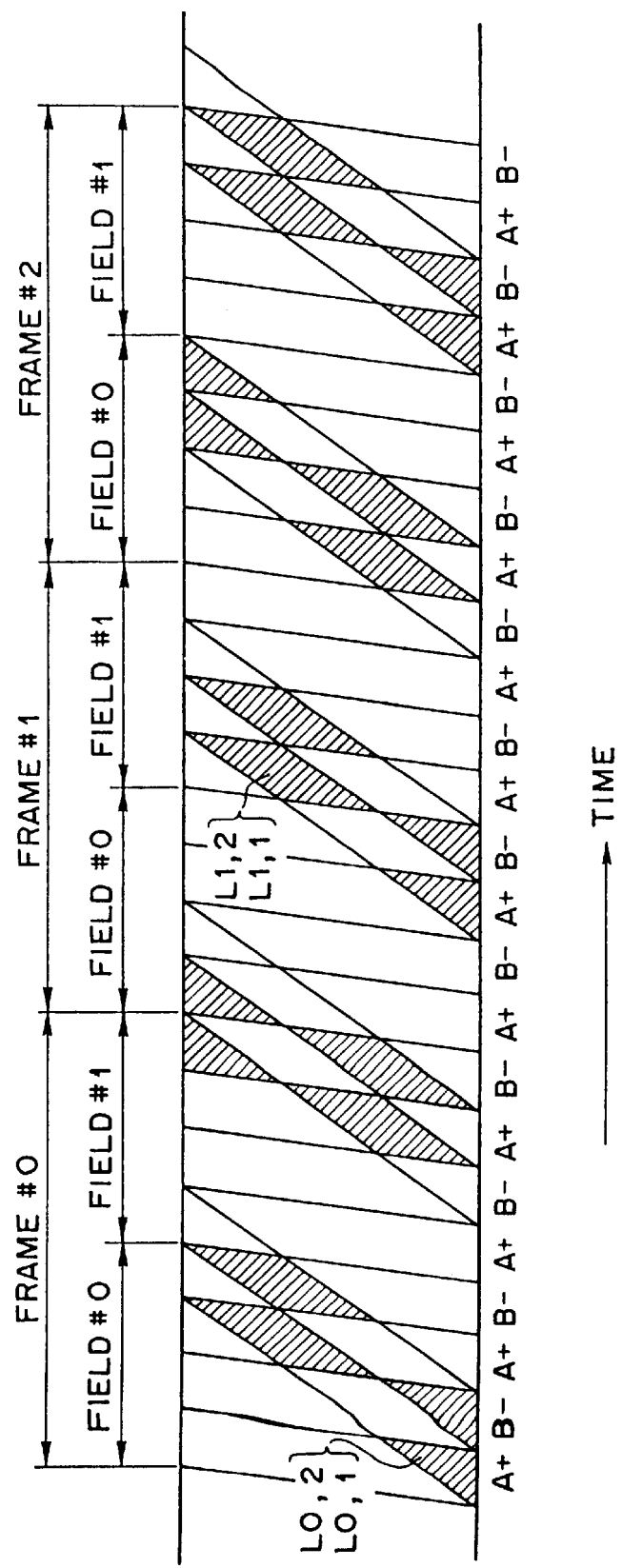
FIG. 8 is a diagram for explaining the head tracing operation in a search reproducing mode.
Figure 9:
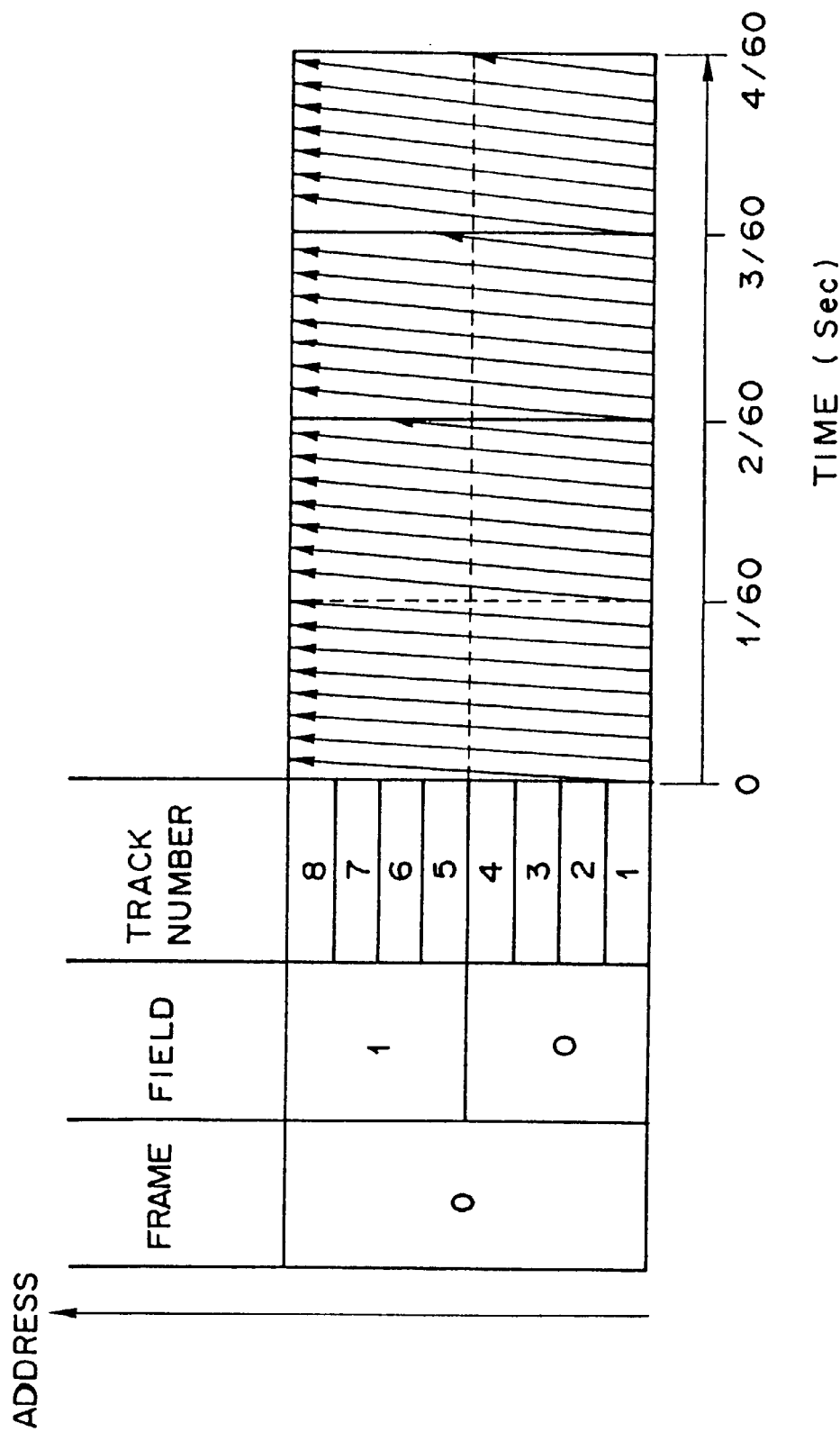
FIG. 9 is a diagram showing the memory access state in the memory of one frame in the search reproducing mode.
Figure 10:
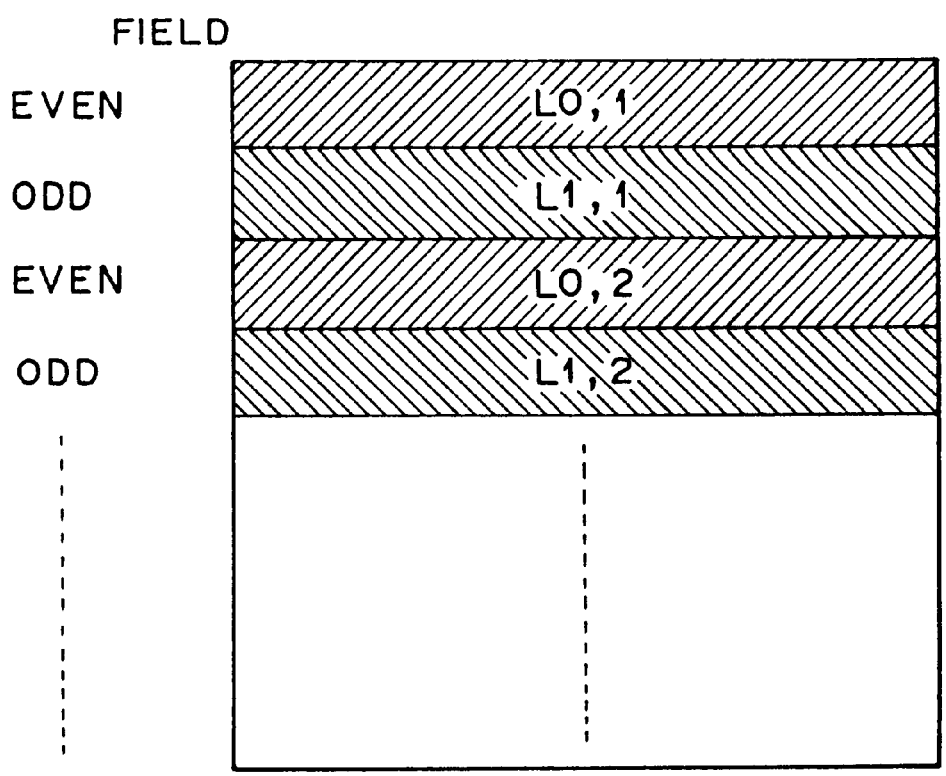
FIG. 10 is a diagram showing line data blocks of an interlace signal.

In the embodiment, a time difference between the neighboring line data blocks $L_{0,1}$ and $L_{1,1}$ as shown in, for example, FIG. 8 is eliminated. When the line data block of either one of the even field and the odd field is reproduced, the corresponding data is rewritten in the memory 134, so that the updating period is fairly reduced. Consequently, even in case of an image which moves at a high speed, a natural search reproducing image can be obtained.

As will be easily understood from the above description, even when data is reproduced at a speed different from that in the recording mode, a natural reproduction image is derived.

What is claimed is:

1. An apparatus comprising:

input means for inputting, reproduced from a tape recording medium, data together with additional data comprising field information;

a memory for storing the input data, said memory having a plurality of memory areas; and control means for determining a memory area into which the input data are to be written and for writing the input data into the determined memory area, said control means having (i) a first mode in which said control means determines the memory area into which the input data are to be written by using the field information, and (ii) a second mode in which said control means determines the memory area into which the input data are to be written without using the field information.

2. An apparatus according to claim 1, further comprising:

means for designating the first mode or the second mode.

3. An apparatus according to claim 1, wherein the first mode includes a normal reproduction mode of a video tape recorder.

4. An apparatus according to claim 1, wherein the second mode includes a special reproduction mode of a video tape recorder.

5. An apparatus according to claim 1, wherein each of said plurality of memory areas has a memory capacity for one field.

6. An apparatus according to claim 1, wherein the additional information indicates whether the data is even-field data or odd-field data.

7. A reproduction apparatus comprising:

reproduction means for reproducing data from a plurality of tracks formed on a magnetic tape by tracing the plurality of tracks with a magnetic head, said data including (i) image data having a plurality of frames each of which comprises a plurality of fields and (ii) field information data indicating a field to which said image data belongs and (iii) additional data indicating positions of that image data in the field to which the image data belongs;

a memory having a plurality of memory areas each of which is capable of storing one field portion of the image data; and control means for controlling said memory to write the image data into said memory, said control means having (i) a first mode in which said control means selectively writes the image data into one of said plurality of memory areas according to the field information data, and (ii) a second mode in which the control means selectively writes the image data into one of said plurality of memory areas according to the additional data without using the field information data.

8. An apparatus according to claim 7, further comprising:

(d) means for designating the first mode or the second mode.

9. An apparatus according to claim 7, wherein the first mode includes a normal reproduction mode of a video tape recorder.

10. An apparatus according to claim 7, wherein the second mode includes a special reproduction mode of a video tape recorder.

11. A reproducing apparatus comprising:

reproduction means for reproducing data from a plurality of tracks formed on a magnetic tape by tracing the plurality of tracks with a magnetic head, the data including (i) image data having a plurality of frames each of which is composed of a plurality of fields and (ii) field information data indicating a field to which image data belongs, and (iii) second additional data indicating positions of the image data in a field to which the image data belongs;

a memory having a plurality of memory areas each of which is capable of storing one field portion of the image data;

mode designation means for designating an operation mode of the apparatus; and memory control means for controlling said memory according to the operation mode designated by said designation means to perform (i) writing of the image data into said memory areas according to the field information data in one operation mode, and (ii) writing of the image data into said memory areas without using the field information data in a different operation mode.

12. An apparatus according to claim 11, wherein said memory control means controls said memory to perform writing of the image data into said memory according to the second additional data in each of the operating modes designated by said mode designation means.

13. An apparatus according to claim 11, wherein the operation mode includes a normal reproduction mode of a video tape recorder.

14. An apparatus according to claim 11, wherein the mode includes a special reproduction mode of a video tape recorder.

15. A reproducing apparatus, comprising:

reproduction means for reproducing data including encoded image data, from a recording medium;

memory means having a plurality of memory areas each being capable of storing the reproduced image data of one picture;

decoding means for decoding the reproduced image data read out from said memory means; and control means for controlling said memory means so that during a normal reproduction mode, the reproduced image data to be decoded by said decoding means are written into or read out from the plurality of memory areas, and so that during a search reproduction mode the reproduced image data to be decoded by said decoding means are written into or read out from only a predetermined memory area of the plurality of memory areas which are used in the normal reproduction mode.

16. An apparatus according to claim 15, wherein said data is divided into a plurality of sync blocks, and wherein each of said plurality of sync blocks includes (i) the image data of a plurality of pixels, (ii) synchronization data, and (iii) identification data indicating a position of the sync block in a picture to which the sync block belongs.

17. An apparats according to claim 16, wherein said memory means stores the reproduced image data according to said identification data.

18. An apparatus according to claim 16, wherein each of said plurality of sync blocks further includes an error correction code.

19. An apparatus according to claim 18, further comprising error correction means for correcting an error in the reproduced data stored in said memory means, by using said error correction code.

20. An apparatus according to claim 16, wherein said reproduction means includes head means for reproducing said data by tracing a plurality of tracks formed on said recording medium, and wherein a predetermined number of the sync blocks are recorded in each of said plurality of tracks.

21. An image signal processing device comprising:

input means for inputting data including encoded image data reproduced from a recording medium;

memory control means for writing the input image data into memory means which has a plurality of memory areas each of which is capable of storing the input image data of one picture, and for reading the image data from said memory means; and decoding means for decoding the image data read out from said memory means, said device having a normal reproduction mode in which the input image data to be decoded by said decoding means are written into or read out from the plurality of memory areas by said memory control means, and a search reproduction mode in which the input image data to be decoded by said decoding means are written into or read out from only a predetermined memory area of the plurality of memory areas which are used in the normal reproduction mode by said memory control means.

22. A device according to claim 21, wherein said memory control means generates writing addresses and reading addresses of said memory means, and wherein said memory control means changes an address generating operation between the normal reproduction mode and the search reproduction mode.

23. A device according to claim 22, further comprising receiving means for receiving a mode indication signal indicating the mode of said device, and wherein said memory control means changes the address generating operation according to the mode indication signal.

24. A device according to claim 21, wherein said decoding means decodes the image data read out from said memory means and expands an information amount of the image data.

25. A device according to claim 21, wherein, in said normal reproduction mode, said input means inputs said data from the recording medium at a speed substantially the same as that in a recording mode, and in said search reproduction mode, said input means inputs said data from the recording medium at a speed faster than that in said recording mode.

26. A device according to claim 21, wherein said data is divided into a plurality of sync blocks and wherein each of said plurality of sync blocks includes (i) the image data of a plurality of pixels, (ii) synchronization data, and (iii) identification data indicating a position of the sync block in a picture to which the sync block belongs.

27. A device according to claim 26, wherein said memory control means stores the input image data according to said identification data.

28. A device according to claim 26, wherein each of said plurality of said sync blocks further includes an error correction code.

29. A device according to claim 28, further comprising error correction means for correcting an error in the reproduced data stored in said memory means, by using said error correction code.

30. A device according to claim 26, wherein said reproduction means includes head means for reproducing said data by trancing a plurality of tracks formed on said recording medium, and wherein a predetermined plurality of the sync blocks are recorded in each of said plurality of tracks.

* * * * *

UNITED STATES PATENT AND TRADEMARK OFFICE
CERTIFICATE OF CORRECTION

PATENT NO. : 6,219,486 B1
DATED : April 17, 2001
INVENTOR(S) : Hidenori Hoshi

Page 1 of 1

It is certified that error appears in the above-identified patent and that said Letters Patent is hereby corrected as shown below:

Column 1,
Line 46, "former half" should read -- first --.
Line 56, "de notes" should read -- denotes --.

Column 2,
Line 36, "(sync) code sync" should read -- sync code (sync) --.
Line 49, "thereby", should read -- thereby --.

Column 9,
Line 52, "(d)" should be deleted.

Column 12,
Line 31, "trancing" should read -- tracing --.

Signed and Sealed this

Nineteenth Day of February, 2002

Attest:

JAMES E. ROGAN
Attesting Officer
Director of the United States Patent and Trademark Office